US007586096B2

(12) United States Patent
Astley et al.

(10) Patent No.: US 7,586,096 B2
(45) Date of Patent: Sep. 8, 2009

(54) INTERFACE ASSEMBLY FOR THERMALLY COUPLING A DATA ACQUISITION SYSTEM TO A SENSOR ARRAY

(75) Inventors: Oliver Richard Astley, Clifton Park, NY (US); James Wilson Rose, Guilderland, NY (US); Joe James Lacey, Cambridge, WI (US); Jonathan David Short, Saratoga Springs, NY (US); Ashutosh Joshi, Waukesha, WI (US)

(73) Assignee: General Electric Company, Niskayuna, NY (US)

( * ) Notice: Subject to any disclaimer, the term of this patent is extended or adjusted under 35 U.S.C. 154(b) by 201 days.

(21) Appl. No.: 11/560,873

(22) Filed: Nov. 17, 2006

(65) Prior Publication Data
US 2008/0116387 A1 May 22, 2008

(51) Int. Cl.
*G01T 1/24* (2006.01)
(52) U.S. Cl. ................................. 250/370.15
(58) Field of Classification Search ............. 250/370.15
See application file for complete search history.

(56) References Cited

U.S. PATENT DOCUMENTS

| | | | |
|---|---|---|---|
| 4,969,167 A | 11/1990 | Zupancic et al. | |
| 5,248,885 A * | 9/1993 | Sato et al. ............. | 250/370.15 |
| 5,355,102 A | 10/1994 | Kornrumpf et al. | |
| 5,444,752 A | 8/1995 | Dobbs et al. | |
| 5,527,741 A | 6/1996 | Cole et al. | |
| 5,799,057 A * | 8/1998 | Hoffman et al. ............ | 378/147 |
| 5,819,137 A | 10/1998 | Hoffman et al. | |
| 6,194,726 B1 * | 2/2001 | Pi et al. ................. | 250/363.1 |
| 6,510,195 B1 * | 1/2003 | Chappo et al. ............ | 378/19 |
| 6,900,565 B2 | 5/2005 | Preston | |
| 6,909,775 B2 | 6/2005 | Ray et al. | |
| 6,933,813 B2 | 8/2005 | Burdick, Jr. et al. | |
| 6,990,176 B2 | 1/2006 | Sherman et al. | |
| 7,062,008 B2 * | 6/2006 | Joshi et al. ............. | 378/19 |
| 7,065,173 B2 | 6/2006 | Lacey et al. | |
| 7,075,089 B2 * | 7/2006 | Pohan ................... | 250/370.09 |
| 7,285,837 B2 * | 10/2007 | Huang et al. ............ | 257/492 |
| 2002/0011097 A1 | 1/2002 | Kuderer et al. | |
| 2002/0148968 A1 * | 10/2002 | Der Haar ............... | 250/370.11 |
| 2004/0022351 A1 | 2/2004 | Lacey et al. | |

(Continued)

OTHER PUBLICATIONS

USPTO Office Action dated Nov. 14, 2008.

*Primary Examiner*—David P Porta
*Assistant Examiner*—Djura Malevic
(74) *Attorney, Agent, or Firm*—Joseph J. Christian

(57) ABSTRACT

An interface assembly for a sensor array is provided. The interface assembly may be made up of an integrated circuit package thermally coupled to the sensor array. The interface assembly may include a temperature control system for controlling the temperature of the sensor array. The temperature control system includes a temperature sensor for sensing a temperature variation of each sensor of the sensor array from an initial temperature beyond a predetermined threshold. A temperature controller is coupled to each temperature sensor and receives an output signal from the temperature sensor upon the sensor temperature variation exceeding the predetermined threshold. A temperature correction device is coupled to each temperature controller and causes the sensor temperature variation to fall within the predetermined threshold upon receiving a control signal from the temperature controller.

18 Claims, 7 Drawing Sheets

U.S. PATENT DOCUMENTS

| | | |
|---|---|---|
| 2004/0071259 A1 | 4/2004 | Lacey et al. |
| 2004/0159713 A1 | 8/2004 | Schmidt et al. |
| 2004/0202287 A1 | 10/2004 | Muller |
| 2004/0228450 A1 | 11/2004 | Mueller |
| 2004/0240625 A1 | 12/2004 | Kendall |
| 2005/0045358 A1 | 3/2005 | Arnold |
| 2005/0287008 A1* | 12/2005 | Lacey et al. .................. 417/32 |
| 2006/0109956 A1 | 5/2006 | Lacey |
| 2006/0153277 A1* | 7/2006 | Yoshida ..................... 374/178 |
| 2007/0221858 A1* | 9/2007 | Abenaim et al. ....... 250/370.11 |
| 2007/0235656 A1* | 10/2007 | Capote et al. .......... 250/370.13 |
| 2008/0006773 A1* | 1/2008 | Rose et al. ............... 250/336.1 |
| 2008/0068815 A1* | 3/2008 | Astley et al. ................ 361/760 |

* cited by examiner

US 7,586,096 B2

INTERFACE ASSEMBLY FOR THERMALLY COUPLING A DATA ACQUISITION SYSTEM TO A SENSOR ARRAY

FIELD OF THE INVENTION

The present invention is generally related to an interface assembly for a sensor array, and, more particularly, to an interface assembly for thermally coupling a data acquisition system (DAS) to a sensor array, as may be used in a computed tomography (CT) system.

BACKGROUND OF THE INVENTION

Electronic devices, such as sensors, transceivers, transmitters, receivers, antennas, etc., may be configured in arrays to transmit or receive data in a two dimensional format or to effect a desired resolution for a given area. For example, one known sensor used in a computed tomography (CT) system includes a photodiode array comprising an array of photosensitive pixels coupled to a scintillating medium, which can also be configured as an array of scintillator cells. When subjected to x-ray energy, the scintillators generate optical photons which in turn excite the underlying photosensitive pixels within the photodiode array thereby producing a set of analog electrical signals, each corresponding to an incident photon flux.

One exemplary CT detector array is known to be configured with a plurality of sensor elements, where, as described above, each sensor element in the CT detector array in turn comprises an x-ray scintillator deposited on a pixel array of photosensitive light sensors. Thus, even a single sensor element may be referred to herein as "sensor arrays." A data acquisition system (DAS) may acquire the analog signals from the sensors and convert these signals to digital signals for subsequent processing.

During the operation of CT systems with photodiode sensor arrays, the sensor array temperature may vary, for example, due to varying environmental conditions. These temperature variations may affect the performance of the CT system, possibly leading to degraded imaging performance in the event of a large temperature variation outside from an established temperature range.

Accordingly, aspects of the present invention provide an interface assembly for thermally coupling a data acquisition system (DAS) to a sensor array that allows measuring temperature variations of the sensor array and may provide effective control of such temperature variations, thus ensuring optimal performance of the CT system.

BRIEF DESCRIPTION OF THE DRAWINGS

These and other aspects of the invention will be more apparent from the following description in view of the drawings that show.

DETAILED DESCRIPTION OF THE INVENTION

Figure 1:
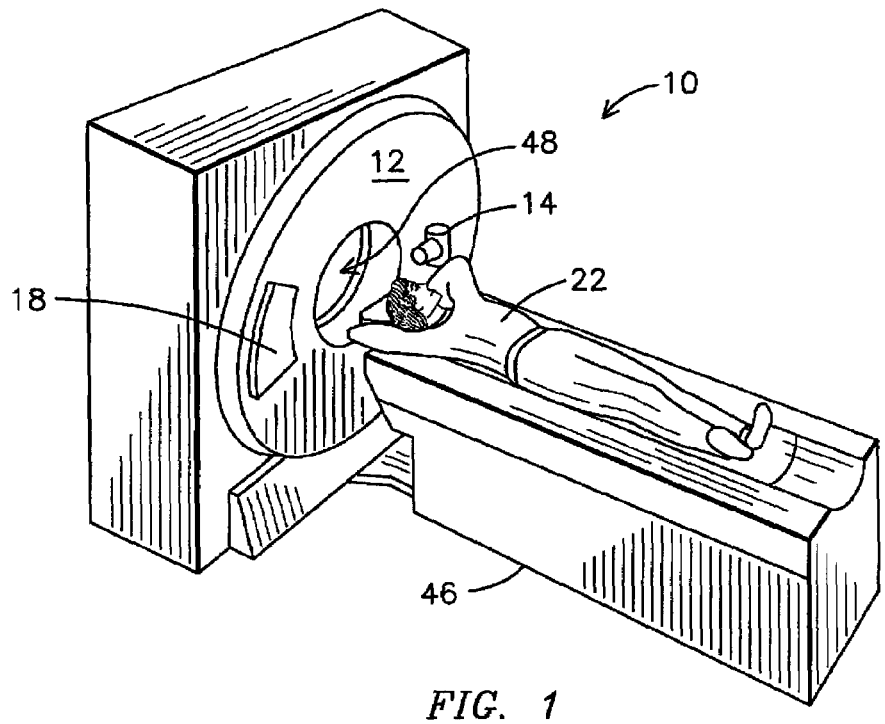
FIG. 1 is an isometric view of an exemplary CT imaging system, as may use a CT sensor array for medical imaging.

As used herein, a "sensor array" refers to a component comprising one or more individual sensors. In many configurations, a sensor array may itself comprise a component having, for example, a two-dimensional array of sensors, and a plurality of sensor arrays may be assembled into a larger assembly referred to as a "detector array." A "sensor array" may comprise an M×N array of sensors; wherein both M and N are integer numbers equal to or greater than one. Thus, the scope of the term "sensor array" is not intended to exclude devices having only one sensor.

By way of illustration, the description below refers to a CT imaging system. It is noted, however, that aspects of the present invention may be advantageously used in various other applications, which are limited neither to medical imaging applications nor to a CT modality. Examples of other modalities may be magnetic resonance, ultrasound, positron emission tomography, and a multi-energy computed tomography. Examples of other applications may be equipment inspections and diagnostics as may be performed in an industrial setting or security inspections as may be performed in a transportation setting, such as a baggage scanning for an airport or container inspection in a port, etc.

In some CT imaging system configurations, an x-ray source projects a fan-shaped beam which is collimated to lie within an X-Y plane of a Cartesian coordinate system and generally referred to as an "imaging plane". The x-ray beam passes through an object being imaged, such as a patient. The beam, after being attenuated by the object, impinges upon an array of radiation detectors. The intensity of the attenuated radiation beam received at the detector array is dependent upon the attenuation of an x-ray beam by the object. Each sensor of the array produces a separate electrical signal that is a measurement of the beam intensity at the detector location. The intensity measurements from all the detectors are acquired separately to produce a transmission profile.

In third generation CT systems, the x-ray source and the detector array are rotated with a gantry within the imaging plane and around the object to be imaged such that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector.

In an axial scan, the projection data is processed to construct an image that corresponds to a two-dimensional slice taken through the object. One method for reconstructing an image from a set of projection data is referred to in the art as the filtered backprojection technique. This process converts the attenuation measurements from a scan into integers called "CT numbers" or "Hounsfield units" (HU), which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighing algorithms that weight the collected data as a function of view angle and detector channel index. Specifically, prior to a filtered backprojection process, the data is weighted according to a helical weighing factor, which is a function of both the gantry angle and detector angle. The weighted data is then processed to generate CT numbers and to construct an image that corresponds to a two-dimensional slice taken through the object.

To further reduce the total acquisition time, multi-slice CT has been introduced. In multi-slice CT, multiple rows of projection data are acquired simultaneously at any time instant. When combined -with helical scan mode, the system generates a single helix of cone beam projection data. Similar to the single slice helical, weighting scheme, a method can be derived to multiply the weight with the projection data prior to the filtered backprojection algorithm.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of aspects of the present invention in which data representing an image is generated but a viewable image is not. However, many embodiments generate (or are configured to generate) at least one viewable image.

Figure 2:
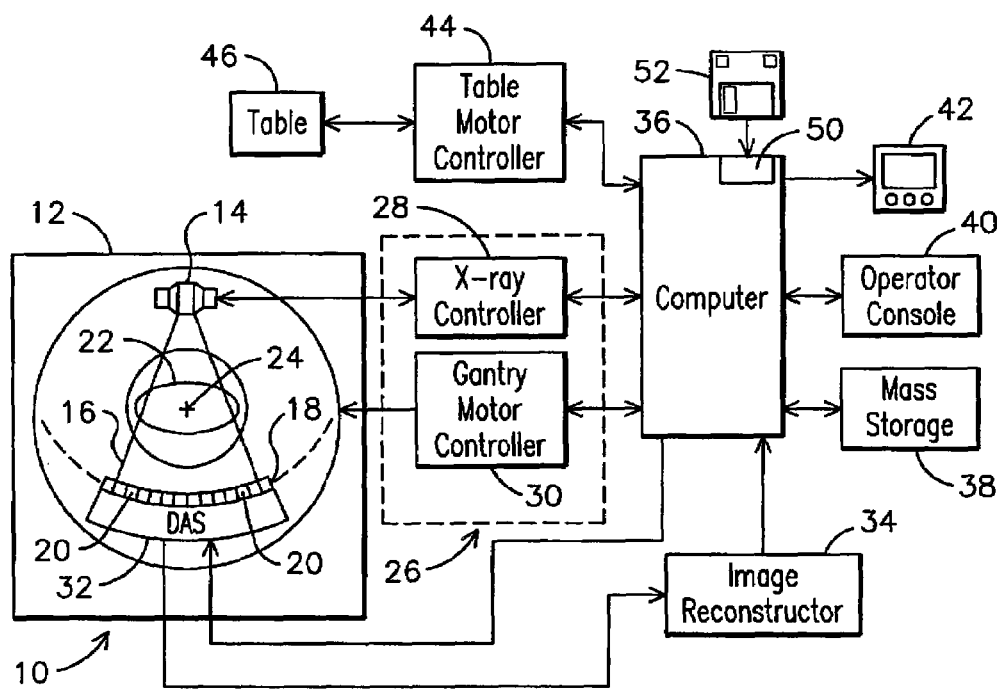
FIG. 2 is a block diagram representation of a CT imaging system as seen in FIG. 1.

Referring to FIGS. 1 and 2, a multi-slice scanning imaging system, for example, a Computed Tomography (CT) imaging system 10, is shown as including a gantry 12 representative of a "third generation" CT imaging system. Gantry 12 has an x-ray tube 14 (also called x-ray source 14 herein) that projects a beam of x-rays 16 toward a detector array 18 on the opposite side of gantry 12. Detector array 18 is formed by a plurality of detector rows (not shown) including a plurality of sensors 20 which together sense the projected x-rays that pass through an object, such as a medical patient 22 between array 18 and source 14. Each sensor 20 produces an electrical signal that represents the intensity of an impinging x-ray beam and hence can be used to estimate the attenuation of the beam as it passes through object or patient 22. The amplitude of the sensor array electrical signals may be dependent upon the temperature of the sensor array, which preferably should remain within an accepted temperature range.

During a scan to acquire x-ray projection data, gantry 12 and the components mounted therein rotate about a center of rotation 24. FIG. 2 shows only a single row of sensors 20 (i.e., a detector row). However, multi-slice detector array 18 includes a plurality of parallel detector rows of sensors 20 such that projection data corresponding to a plurality of quasi-parallel or parallel slices can be acquired simultaneously during a scan.

Rotation of components on gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of components on gantry 12. One or more components of a data acquisition system (DAS) 32 may be directly mounted to be thermally coupled to the sensor array (as described below in greater detail using an interface assembly embodying aspects of the present invention). The DAS is configured to receive analog signals from sensors 20 and convert the analog signals to digital signals for subsequent processing. An image reconstructor 34 receives sampled and digitized x-ray data from DAS 32 and performs high-speed image reconstruction. The reconstructed image is applied as an input to a computer 36, which stores the image in a storage device 38. Image reconstructor 34 can be specialized hardware or computer programs executing on computer 36.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28, and gantry motor controller 30. In addition, computer 36 operates a table motor controller 44, which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Although the specific embodiment mentioned above refers to a third generation CT system, the methods described herein equally apply to fourth generation CT systems (stationary detector--rotating x-ray source) and fifth generation CT systems (stationary detector and x-ray source).

For readers desirous of general background information regarding an exemplary sensor array, such as a tileable sensor array, that may benefit from aspects of the present invention, reference is made to U.S. Pat. No. 6,990,176, which is assigned in common to the same assignee of the present invention and is herein incorporated by reference. The sensor array described in the foregoing patent may be used with a system, such as a computed tomography imaging system, a magnetic resonance imaging system, a Positron Emission Tomography (PET) system, and a multi-energy computed tomography imaging system.

A transducer broadly refers to a device for converting a signal in a given physical form, such as radiation, sound, temperature, pressure, light or other physical form to (or from) an electrical signal. In an example embodiment, a sensor array may include a plurality of transducers configured to receive an input signal in a given physical form and transmit a desired electrical output signal. For example, a transducer array may include a plurality of sensor devices, such as a photodiode, a back-illuminated photodiode, a sonic sensor, i.e. a sensor configured to detect sounds, a temperature sensor, and an electromagnetic radiation sensor. For purposes of the present invention, one basic concept being that a sensor array is thermally coupled (e.g., by being directly mounted) to a data acquisition system (DAS) and this enables measuring temperature variations therein and, if so desired, providing temperature control of the sensor array to ensure that variations in the sensor array temperature do not exceed a predetermined temperature range.

The inventors of the present invention have innovatively recognized an interface assembly providing thermal coupling between one or more components of a data acquisition system (DAS) and a sensor array. For the sake of the reader gaining a visual perspective that should be conducive to appreciating some of the constraints faced by prior art interfaces, and better appreciating some of the benefits afforded by the present invention, FIGS. 3 and 4 are provided.

Figure 3:
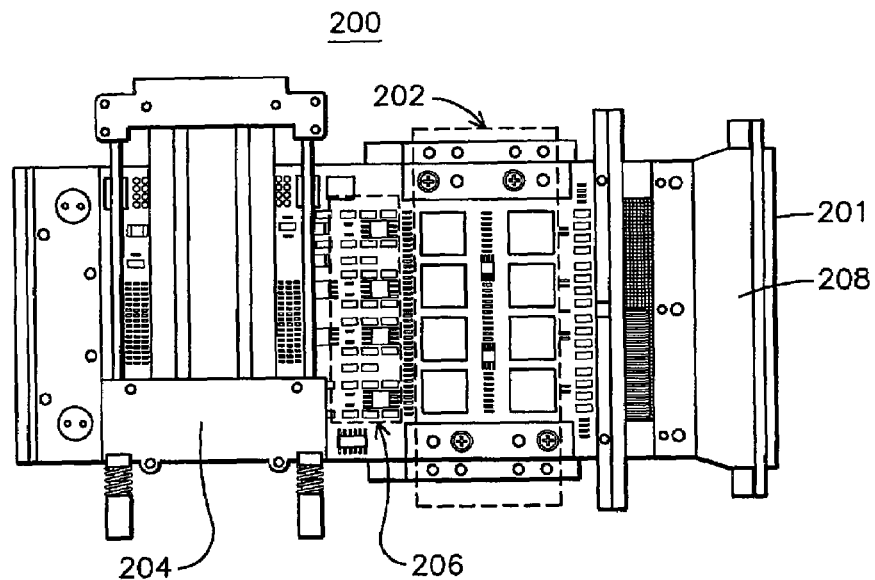
FIG. 3 is an elevational top view illustrative of a typical prior art interface between a sensor array and components of a data acquisition system.

FIG. 3 is an elevational top view illustrative of a typical prior art interface 200 between a sensor array 201 and DAS components, such as analog-to-digital (A/D) converters 202, a digital processor 204, one or more discrete circuit components and/or support electronics 206. Note the use of a relatively high-density and lengthy analog signal flex connector 208 for establishing interconnect paths between the sensor array and the A/D converters.

Figure 4:
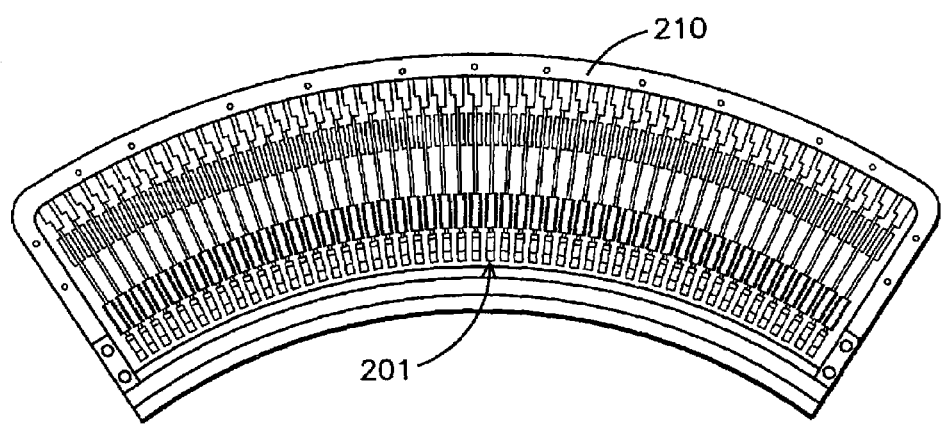
FIG. 4 is an elevational side view of a plurality of interfaces (as the single interface shown in FIG. 3) for respective sensor arrays disposed in an arcuate frame to provide a view over the arc segment spanned by the frame.

FIG. 4 is an elevational side view of a plurality of interfaces (e.g., a plurality of 57 interfaces as the single interface shown in FIG. 3) for respective sensor arrays 201 disposed in an arcuate frame 210, to provide, for example, a view over an arc segment spanned by the frame. Note the relatively large (yet cramped) volume occupied by the interfaces in the frame. It should be appreciated that the volumetric footprint taken by such prior art interfaces has posed non-trivial challenges in connection with cooling electronic components of the interface and in controlling temperature variations of the sensor array.

Figure 5A:
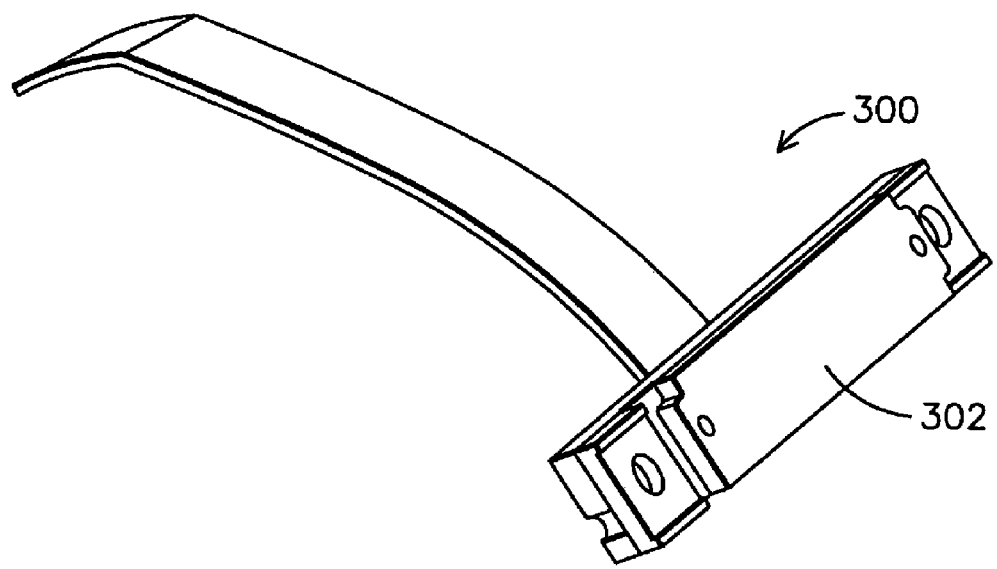
FIGS. 5A and 5B respectively illustrate top and bottom isometric views of an interface assembly embodying aspects of the present invention, such as may allow thermally coupling DAS components to the sensor array.
Figure 5B:
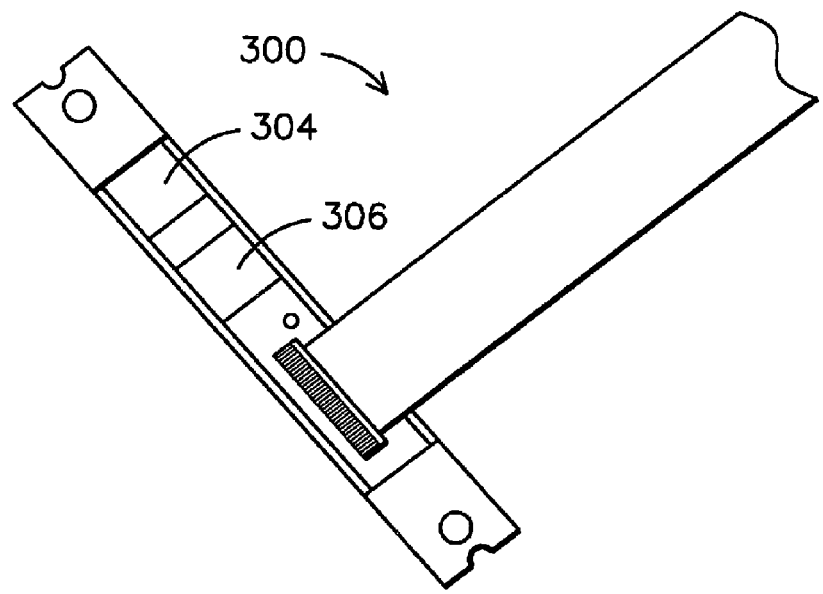

FIGS. 5A and 5B respectively illustrate top and bottom isometric views of an assembly 300 embodying aspects of the present invention, such as may allow thermal coupling of one or more DAS components on a sensor array 302. As better appreciated in FIG. 5B, a digital processor 304 and/or one or more discrete circuit components and support electronics 306 may be thermally coupled on the back side of the assembly 300. Note the compactness of the assembly 300 and the elimination of the high-density and lengthy flex connector with a concomitant reduction in the number and/or distance of the interconnect paths between the photodiode array and the DAS.

In one example embodiment, the present invention makes use of a chip scale interface architecture that in one aspect allows segregating (e.g., in an integrated circuit package) signals having a given electrical characteristic (e.g., relatively sensitive analog signals) from signals having different electrical characteristics with respect to the given electrical characteristic (e.g., digital and/or power signals). One example embodiment may be used in a data acquisition system that provides a desired signal conditioning (e.g., analog-to-digital conversion) to the sensitive analog signals from a CT detector array.

In one example embodiment, the interface architecture may feature appropriately disposed vias (i.e., vertical interconnects) within the package that allow segregating the analog sensor interconnections from the digital and power interconnections. For example, the analog interconnections may be made at a first region of the package (e.g., a top face of the package), and the digital signals and power interconnections may be made at a second region spaced apart from the first region (e.g., a bottom face of the package). It is contemplated that the top face of the package need not be limited to analog signals from the sensor array since, for example, one could provide at least one or more I/Os on this face that may be used for IC testing, but not be used in the final application. For example, this may reduce the number of I/Os on the mostly digital I/O side of the package.

Figure 6A:
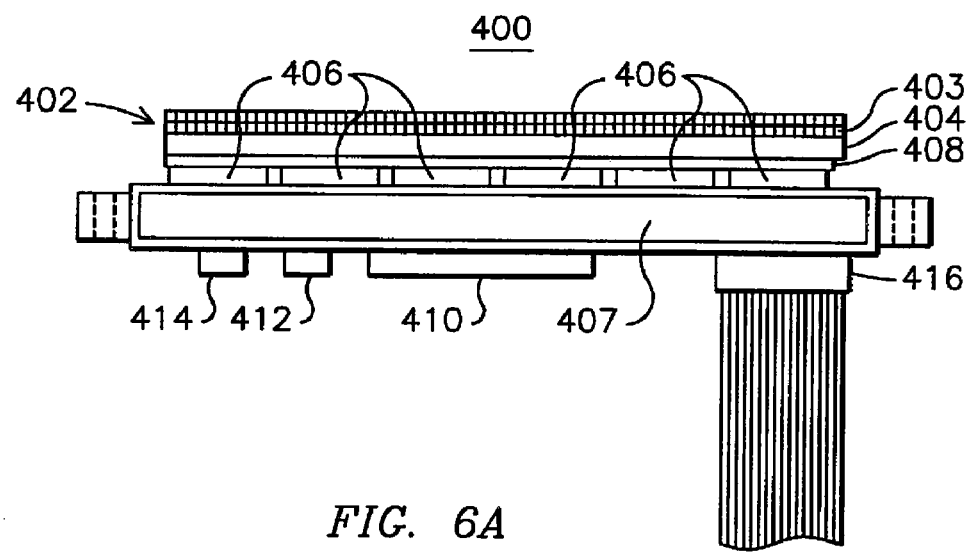
FIGS. 6A, 6B, 6C respectively illustrate a cross-sectional view, a top isometric view, and a schematic of an example embodiment of a thermal control system as may be disposed in an assembly embodying aspects of the present invention
Figure 6B:
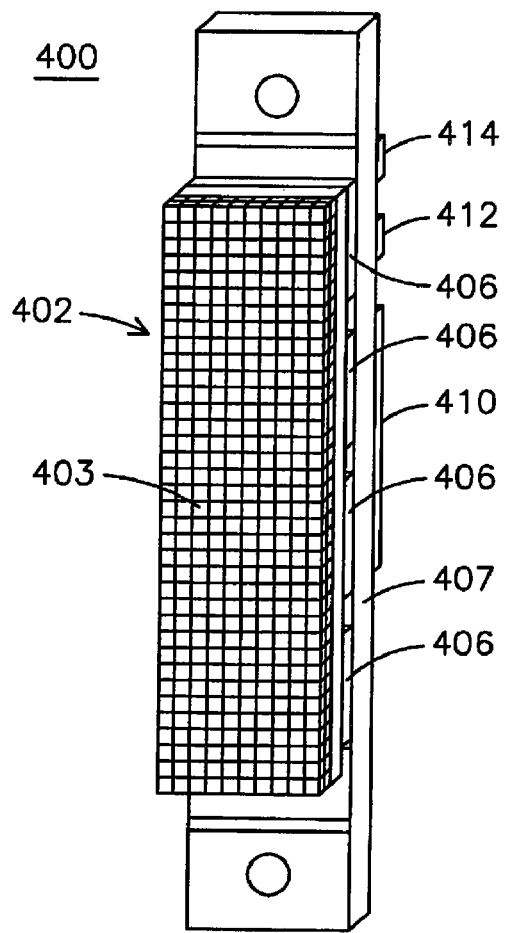
Figure 6C:
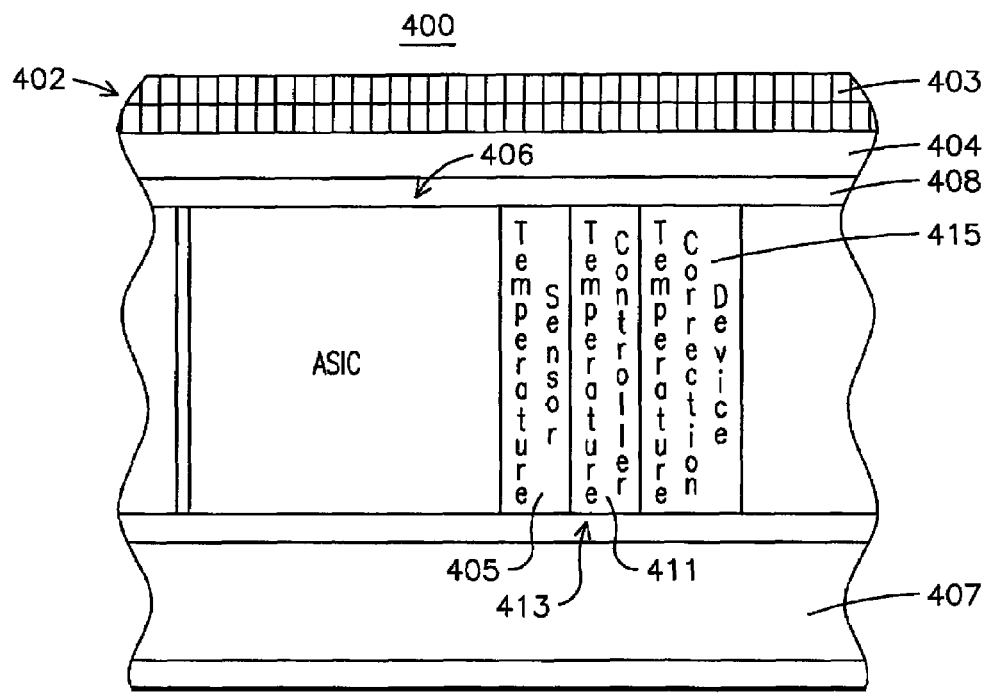

FIGS. 6A, 6B, and 6C respectively illustrate a cross-sectional view, a top isometric view, and a schematic of an example embodiment of a thermal control system as may be part of an interface assembly 400 embodying aspects of the present invention. A sensor array 402, such as may comprise in one example embodiment, a scintillating layer 403 and a photodiode array 404, is configured to generate a plurality of analog signals to be digitized by one or more A/D converters 406 disposed beneath the sensor array 402 on a substrate 407. The sensor array 402 may be based on a given sensing modality, such as magnetic resonance, ultrasound, positron emission tomography, or computed tomography, for example. The one or more A/D converters 406 may comprise an integrated circuit (e.g., an Application Specific Integrated Circuit (ASIC)) for providing a desired signal conditioning to a plurality of analog signals from the sensor array 402. A substrate 407 may include a thermally conductive ceramic material, such as made up of aluminum nitride. Optionally one may provide a mapping layer 408 for mapping a given sensor array layout to a given layout of input connections for the A/D converters.

By enabling a direct mounting of the one or more integrated circuits 406 to the sensor array 402, the interface assembly 400 allows to thermally couple the one or more integrated circuits 406 to the sensor array 402. In one example embodiment, the thermal coupling may be achieved through the physical proximity of integrated circuits 406 to sensor array 402, (more precisely to scintillating layer 403 and photodiode array 404, as the performance of these components is temperature-sensitive). By way of example, the physical separation between integrated circuits 406 and photodiode array 404 may be less than one millimeter. By way of contrast, in the prior art interface assembly of FIG. 3, the separation between sensor array 201 and A/D converters 202 is in the order of several centimeters, and thus an effective thermal coupling is lacking between such components. It will be appreciated that in addition to physical proximity, a suitable thermally conductive path is needed for establishing an appropriate thermal coupling between such components. That is, the thermal coupling established between such components may be a function of distance (e.g., physical proximity) and the thermally conductive path there between. As will be appreciated by those skilled in the art, various combinations of physical proximity and conductive path characteristics may be used for achieving a desired thermal coupling for a given application. Moreover, the thermal coupling may be configured so that in one example embodiment the sensor and the DAS electronics may be at substantially the same temperature or optionally at a predictable temperature offset with respect to one another.

As illustrated in FIG. 6C, in one example embodiment the interface assembly 400 may include a temperature control system 413 for controlling the temperature of one or more of integrated circuits 406 and in turn the temperature of sensor array 402 because of the thermal coupling established there between. The temperature control system 413 illustratively may include a temperature sensor 405 for sensing a temperature variation, as may affect the sensor array 402. For example, the temperature variation may be from an initial calibration temperature to a temperature beyond a predetermined temperature range.

As mentioned above, scintillating layer 403, photodiode array 404, and integrated circuits 406 each may have a respective operational performance which is temperature-sensitive. In one example embodiment, the initial calibration of these components may be performed during assembly by the manufacturer. During operation, the local temperatures, as may be sensed by an interface assembly embodying aspects of the present invention, constitute additional inputs that can be used in a variety of thermal control techniques: In one example embodiment, the temperature inputs can be used to generate correction offsets to the signals from the photodiodes. In another example embodiment, the temperature inputs can be used as part of a feedback mechanism in an active temperature regulation loop, as described below in greater detail.

For instance, the thermal control system can use the temperature feedback to provide information to a correction algorithm. The control can be evaluated with respect to temperature deviations from a calibration temperature, which may be measured and logged as part of the manufacturing/operation design of the machine (e.g., variable setpoint). Other example thermal control technique that may be used is a predefined constant control set point, as may be set during manufacturing operations (e.g., fixed setpoint). Under either technique, the basic principle is essentially to control or correct for temperature variation with respect to a setpoint. Moreover, the thermal control technique may be optionally adapted to be a one-way control (e.g., one sided) to maintain temperature control by way of imparting control or correction to a temperature deviation that exceeds a given temperature limit, where the thermal limit may be fixed or variable setpoint.

The temperature control system 413 may further include a temperature controller 411 coupled to temperature sensor 405, where the temperature controller receives an output signal from the temperature sensor indicative of temperature variation, as may exceed the predetermined temperature range. The temperature control system 413 may further include a temperature correction device 415 coupled to temperature controller 41 1, where temperature correction device 415 causes the sensor array temperature variation to fall within the predetermined temperature range in response to a control signal from the temperature controller.

Although FIG. 6C illustrates a temperature control system that connects one temperature sensor to a respective temperature controller and temperature correction device ( such as each may be integrated in a given integrated circuit 406), it should be appreciated that the temperature control system may include a common temperature controller and temperature correction device for additional temperature sensors as may be disposed in separate integrated circuits and/or other suitable temperature sensing locations throughout the interface assembly and sensor array.

Figure 10:
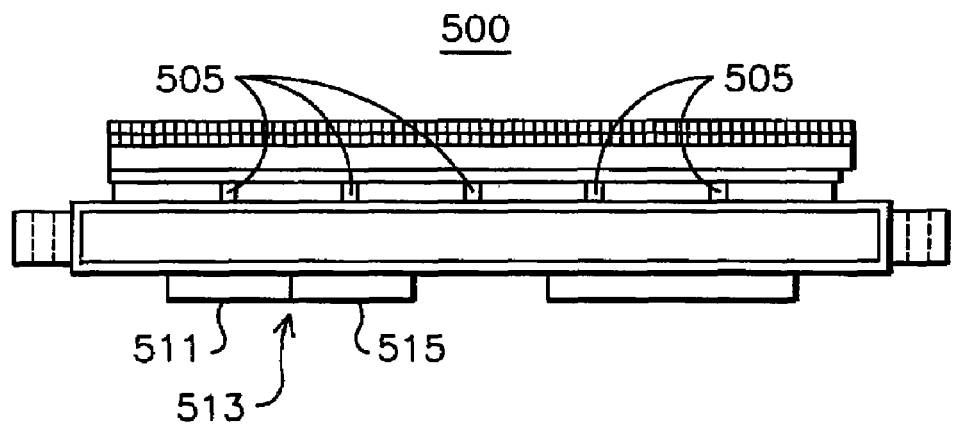
FIG. 10 is a cross sectional view of an assembly embodying aspects of the present invention.

As illustrated in FIG. 10, in one example embodiment an interface assembly 500 may include a temperature control system 513 having a common temperature controller 511 coupled to a plurality of temperature sensors 505, where the temperature controller calculates an average temperature measurement from the plurality of temperature sensors indicative of an average temperature variation. By way of example, the temperature controller 511 may be part of a field programmable gate array (FPGA). The temperature control system 513 may further include a temperature correction device 515 coupled to the temperature controller 511, where the temperature correction device causes the temperature variation to fall within the predetermined temperature range in response to a control signal from the temperature controller.

The thermal coupling provided by the interface assembly 400 between the one or more integrated circuits 406 and the sensor array 402 enables to sense temperature variation as may occur in the sensor array and the respective integrated circuits thermally coupled to the sensor. For example, the respective temperature sensor 405 can measure temperature variation in the respective integrated circuit 406, and thereby can measure temperature variation affecting the sensor array 402 by virtue of the thermal coupling provided by the interface assembly 400 between the integrated circuit and the sensor array.

Aspects of the present invention innovatively recognize that various techniques may be used for obtaining a temperature indication. For example, as illustrated in FIG. 6C, each temperature sensor 405 may be an integral part of a respective integrated circuit 406. For example, temperature sensor 405 may sense temperature variation of the integrated circuit 406 (and thus of the sensor array 402 thermally coupled to the integrated circuit) by utilizing a thermally-sensitive voltage reference therein, such as a bandgap reference of a semiconductor device.

In another example, the temperature sensor 405 may utilize an external voltage reference coupled to drive a thermally-sensitive electrical component in the integrated circuit 406, such as a resistor, diode, capacitor, or a transistor. In yet another example, the temperature sensor 405 may sense temperature in the respective integrated circuit 406 by monitoring, for example, a diode current leakage or monitoring leakage through an electro-static discharge (ESD) pad. That is, some of the circuitry that is part of the integrated circuit (typically used for conditioning the signals from the sensor array) may be used for obtaining a temperature indication of the sensor array. Also the temperature sensor may be assembled onto suitable pads built in the integrated circuit, such as a surface-mounted miniature thermistor mounted on diode pads.

It should be appreciated that temperature sensor 405 need not be integral to a respective integrated circuit 406, since, for example, the temperature sensor may be disposed external to the integrated circuit, such as mounted on an outer surface thermally coupled to the integrated circuit.

Figure 11:
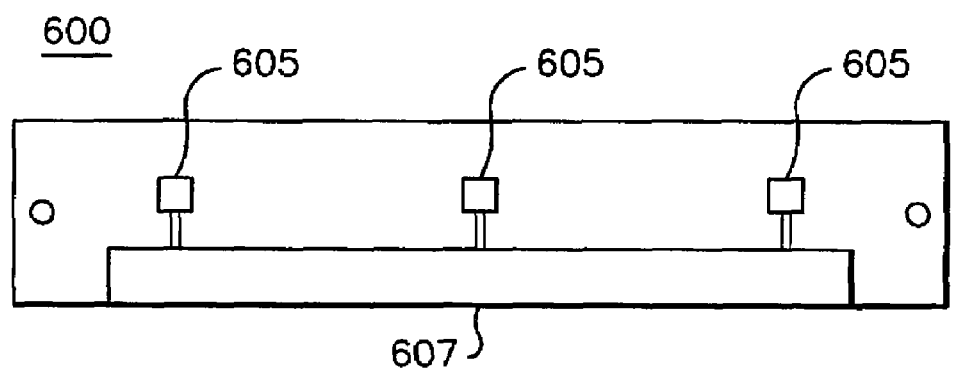
FIG. 11 is a top view of an assembly embodying aspects of the present invention.

FIG. 11 illustrates an example embodiment of an interface assembly 600 including a plurality of temperature sensors 605 coupled to the outer surface of a substrate 607 for supporting each of the integrated circuits. Alternatively, each temperature sensor may be integral (e.g., embedded) with the substrate. Additionally, a temperature sensor may be a redundant sensor element of the sensor array 402, wherein such a sensor element is monitored for temperature variation, as discussed above, and may include a cover to shield unwanted radiation from exciting the redundant sensor element. For example, such a redundant sensor may be disposed in an area outside the field of view normally used for performing a scan. In this case, the redundant sensor would not function as an x-ray detector but as a temperature sensor. In lieu of using a redundant sensor element in the sensor array one may optionally use a temperature sensor which is not of the same type as a sensor array element.

In one example embodiment, upon an indication of sensor array temperature increasing from an initial calibration temperature to beyond the predetermined temperature range, a respective temperature sensor 405 may output a "hot" output signal to temperature controller 411. The "hot" output signal causes the temperature controller 411 to output a "cool" control signal to a temperature correction device 415 to cool the sensor array temperature to within the predetermined temperature range. Conversely, upon an indication of sensor array temperature decreasing from the initial calibration temperature beyond the predetermined temperature range, the respective temperature sensor 405 may output a "cool" output signal to temperature controller 411. In this case, the cool output signal causes the temperature controller 411 to output a "hot" control signal to temperature correction device 415 to increase the sensor array temperature to within the predetermined temperature range. The magnitude of the control signal and the rate at which each temperature correction device increases or decreases the sensor temperature may be proportional to the temperature variation from the initial temperature.

In one example embodiment, the temperature correction device 415 may comprise a heat dissipation circuit (e.g., a current sink). Such a heat dissipation circuit 415 may include a resistor or capacitor switching component.

The temperature correction device 415 may take the form of a digital processor 410 in a respective integrated circuit 406, wherein the clocking rate of the digital processor is reduced upon receiving a cool control signal from the temperature controller 411 during a non-data acquisition mode. Similarly, the clock rate may be increased upon receiving a heat control signal from the temperature controller 411 during a non-data acquisition mode. The clock rate may be restored during normal data acquisition mode, and may be coupled to the clock rate of the x-ray controller (see FIG. 2) during normal data acquisition.

An analog-to-digital device (not shown) may be utilized to convert each output signal from each temperature sensor 405 into a digital signal, and each temperature controller 411 may include a digital-to-analog converter to convert the digital output signal into an analog control signal for each temperature correction device 415, as previously discussed.

Figure 7:
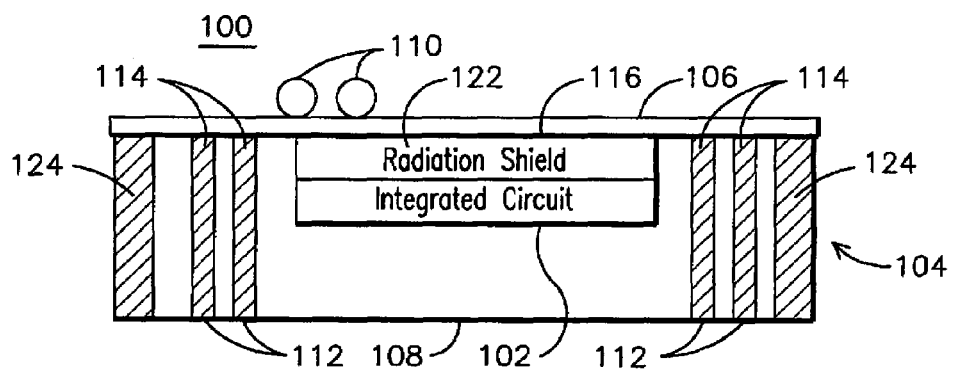
FIG. 7 is a cross sectional view of an interface embodying aspects of the present invention, as such interface may be assembled in an integrated circuit package thermally coupled to a sensor array.

In accordance with other aspects, e.g., for reasons of mechanical and/or environmental robustness, one can optionally fill gaps that may be present between the A/D converters. This may be accomplished through the use of a suitable underfill material to fill any gaps between the A/D converters. FIGS. 6A, 6B and 6C further illustrate a digital processor 410 as may be mounted on the underside of substrate 407. As noted above, one or more discrete circuit components 412 and support electronics 414 may be mounted on the on the underside of substrate. It is contemplated that processor 410 could be optionally disposed in a trench constructed in substrate 407. FIG. 6A also illustrates a connector 416 as may be used for carrying digital and power signals to the interface assembly. The description below will describe a packaging structure, which constitutes one example embodiment for the interface assembly FIG. 7 is a cross sectional view of an interface circuit 100 for a sensor array. The interface circuit may be fabricated using standard integrated circuit manufacturing technology.

Accordingly, for the sake of avoiding unnecessary details the reader will be spared from minutia that should be readily understood by one skilled in the art. For readers desirous of general background information regarding various processes and materials used in IC fabrication, reference is made to textbook titled "Silicon Processing For The VLSI Era, Vol. 1—Process Technology, $2^{nd}$ Edition by S. Wolf and R. N. Tauber, published and copyrighted by Lattice Press, which textbook is herein incorporated by reference.

The interface circuit includes a package 104 that defines a first region 106 (e.g., a top face) and a second region 108 (e.g., a bottom face). The first region of the package includes a plurality of interfaces (e.g., interfaces 110) for interconnecting an integrated circuit 102, such as an ASIC configured to provide suitable analog-to-digital conversion, to a plurality of signals having a first electrical characteristic (e.g., relatively sensitive analog signals from a sensor array). The second region of the package comprises a plurality of interfaces 112 for interconnecting to the integrated circuit a plurality of signals having at least one electrical characteristic different than the first characteristic (e.g., digital signals and power signals).

Figure 9:
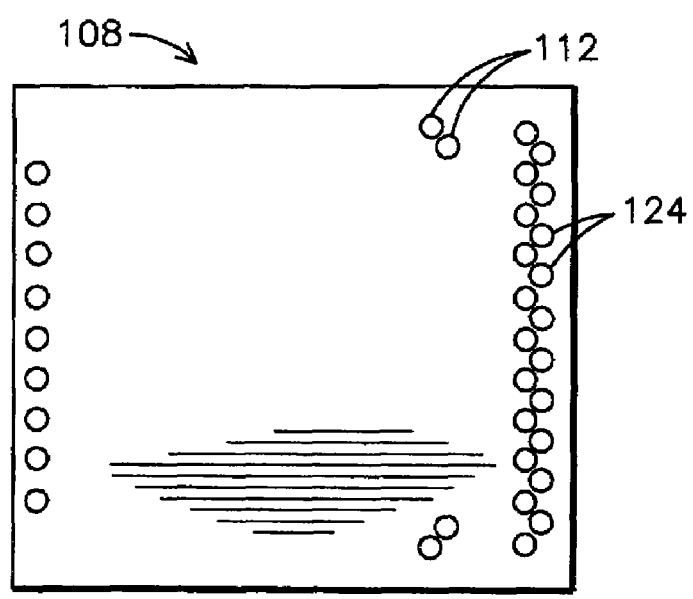
FIG. 9 is a view of the face of the interface package as may be configured for interconnecting to digital and power signals, thereby segregating such signals from the sensor array signals received at the top face of the package.

An example embodiment of the second region and interfaces 112 may be better appreciated in FIG. 9, which illustrates a bottom view of the interface package. A plurality of electrically conductive vias 114 (FIG. 7) may be disposed to provide a plurality of electrical paths, such as generally vertical paths disposed between the second region and the first region of the interface package and may be interconnected to one or more routing layers 116 for electrical routing of the digital and power signals received at the bottom face to the ASIC. It will be appreciated that the construction of vias within the package is not a requirement being that, for example, a flex connector may be disposed to be externally wrapped around the package to pass signals from the sensor array to the ASIC.

Figure 8:
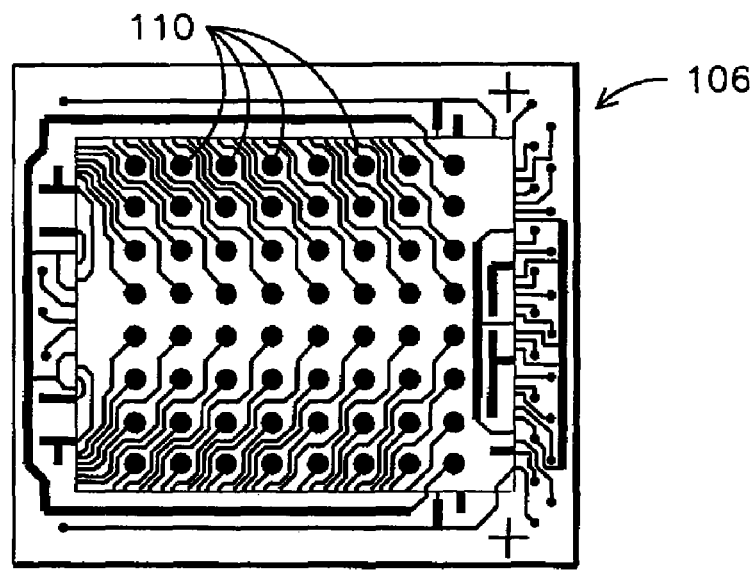
FIG. 8 is a view of the top face of the interface package showing an example array of interface pads arranged to match an array of corresponding sensor interface pads.

In one example embodiment better appreciated in FIG. 8, the top face of the interface package comprises an array of interface pads 110 arranged to match an array of corresponding sensor array interface pads (not shown). It is envisioned that this arrangement may be particularly advantageous since it essentially allows a direct connection (i.e., without interconnecting leads) between the sensor array and the DAS package. As noted above, this connection may be optionally made through a mapping layer configured to map a given sensor array layout to a given layout of input connections for the A/D converters. In one example embodiment, such direct connections may be made using any of various means for electrically connecting two elements, such as solder, an anisotropic conductive film (ACF) or paste (ACP), an ultrasonic bonding, a thermosonic bonding, and a thermocompression bonding.

In one example embodiment, such as in CT application where the ASIC may be subjected to X-ray radiation, it is contemplated that one may optionally provide a radiation shield 122 (FIG. 7), such as a slug made of tungsten or any other suitable metal or alloy, positioned to block X-rays that otherwise could pass through the top face of the package onto the ASIC in the package. It is contemplated that a flip-chip CSP (Chip Scale Package) may be preferred in an example embodiment without a top radiation shield 122, and a wirebond CSP may be used when top radiation shield 122 is utilized.

In another example embodiment, one may provide one or more lateral shields 124 (e.g., tungsten slugs or any other suitable metal or alloy) that may block scattered X-ray radiation. It will be appreciated that the lateral shields may also function as an EMI shield. Essentially, the combination of top shield 122 and lateral shield/s 124 may be configured to function as a Faraday cage in environments subject to relatively large electromagnetic fields, e.g., a magnetic resonance application. The lateral shield may take various forms, such as (a singular or segmented ring) that extends along the periphery of the package, or may take the form of a nested shield or a honeycomb-like structure. The ASIC, shields, and interconnecting structures may be encapsulated in the IC package by a suitable encapsulant.

It is contemplated that the described electrical interface architecture will enable an assembly that in one example application, such as in a multi-slice CT system, provides the following exemplary advantages: reduction of unwanted parasitics (e.g., an undesired signal current, capacitance, inductance or other parameter in an electronic circuit and/or interface) thereby increasing sensor array signal integrity, relatively uncomplicated manufacturing and serviceability, reduced cost, improved reliability through reduction of number and/or length of interconnects, reduction of shear forces on the electronics, increased available cooling volume in the CT detector, and available volume for providing temperature tracking and control of the detector. As noted above, a thermal coupling architecture embodying aspects of the present invention can be used in sensor arrays based on diverse sensing modalities.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A system comprising:
    a sensor array based on a given sensing modality;
    at least one integrated circuit for providing a desired signal conditioning to a plurality of analog signals from the sensor array, wherein the at least one integrated circuit is directly mounted on to the sensor array establishing thermal coupling there between; and
    at least one temperature sensor configured to sense temperature variation affecting the sensor array, the at least one temperature sensor disposed in a location selected from at least one of the following locations: a location at the sensor array, and a location within the integrated circuit, wherein the temperature sensor comprises a sensor element disposed at the sensor array but outside a field of view of the sensor array, the sensor element being of a type as used in the sensor array and comprising a cover to shield radiation from exciting the sensor element.

2. The system of claim 1, wherein said at least one temperature sensor is coupled to an outer surface of a substrate of the interface assembly for supporting said at least one integrated circuit.

3. The system of claim 1, wherein said at least one temperature sensor comprises circuitry that is part of said at least one integrated circuit.

4. The system of claim 3, wherein said at least one temperature sensor is based on a reference signal from the circuitry that is part of said at least one integrated circuit, the reference signal being responsive to temperature variation.

5. The system of claim 4, wherein the reference signal comprises a bandgap reference voltage of a semiconductor device, said semiconductor device constituting the circuitry that is part of said at least one integrated circuit.

6. The system of claim 4, wherein said at least one temperature sensor is based on an externally-derived reference signal coupled to a thermally sensitive component in the integrated circuit.

7. The system of claim 6, wherein the thermally sensitive electrical component includes one of a resistor, a diode, a capacitor, a transistor and a combination thereof.

8. The system of claim 3, wherein said at least one temperature sensor is based on monitoring a leakage signal from the circuitry of said at least one integrated circuit, the leakage signal being responsive to temperature variation.

9. The system of claim 3, wherein said at least one temperature sensor is based on monitoring a leakage signal from the circuitry that is part of said at least one integrated circuit though an electro-static discharge pad.

10. The system of claim 1, wherein said at least one temperature sensor comprise a miniaturized thermistor surface-mounted on circuitry that is part of said at least one integrated circuit.

11. The system of claim 1, wherein said at least one temperature sensor is embedded in a substrate of the interface assembly for supporting said at least one integrated circuit.

12. The system of claim 1 further comprising a temperature control system for controlling temperature of the sensor array, said temperature control system comprising:
    at least one temperature controller coupled to said at least one temperature sensor for receiving an output signal from the temperature sensor indicative of the temperature variation; and
    at least one temperature correction device coupled to the temperature controller, the temperature correction device operable to cause the temperature variation to be within a predetermined temperature range in response to a control signal from the temperature controller.

13. The system of claim 12, wherein said at least one temperature correction device comprises a heat dissipation circuit.

14. The system of claim 13, wherein the heat dissipation circuit comprises one of a resistor, a capacitor, and a combination thereof.

15. The system of claim 12, wherein said at least one temperature correction device comprises a digital processor in the at least one integrated circuit, wherein a clocking rate of said digital processor is selectively adjusted in response to a control signal from said at least one temperature controller during a non-data acquisition mode, and wherein said clocking rate is restored to a predetermined rate during a normal data acquisition mode.

16. The system of claim 12 comprising:
    one temperature controller coupled to a plurality of temperature sensors, wherein said temperature controller calculates an average temperature value from said plurality of temperature sensors indicative of an average sensor array temperature deviation, and;
    one temperature correction device coupled to said temperature controller, said temperature correction device operable to cause said average sensor array temperature variation to fall within said predetermined temperature range in response to an average control signal from said temperature controller.

17. The system of claim 1 wherein the sensing modality for the sensor array is selected from the group consisting of magnetic resonance, ultrasound, positron emission tomography, and computed tomography.

18. A system comprising:
    a sensor array based on a given sensing modality;

at least one integrated circuit for providing a desired signal conditioning to a plurality of analog signals from the sensor array, wherein the at least one integrated circuit is directly mounted on to the sensor array establishing thermal coupling there between;

at least one temperature sensor configured to sense temperature variation affecting the sensor array, the at least one temperature sensor disposed in a location selected from at least one of the following locations: a location at the sensor array, and a location within the integrated circuit; and a temperature control system for controlling temperature of the sensor array, said temperature control system comprising:

at least one temperature controller coupled to said at least one temperature sensor for receiving an output signal from the temperature sensor indicative of the temperature variation; and at least one temperature correction device coupled to the temperature controller, the temperature correction device operable to cause the temperature variation to be within a predetermined temperature range in response to a control signal from the temperature controller, wherein said at least one temperature correction device comprises a digital processor in the at least one integrated circuit, wherein a clocking rate of said digital processor is selectively adjusted in response to a control signal from said at least one temperature controller during a non-data acquisition mode, and wherein said clocking rate is restored to a predetermined rate during a normal data acquisition mode.

* * * * *

UNITED STATES PATENT AND TRADEMARK OFFICE
CERTIFICATE OF CORRECTION

PATENT NO. : 7,586,096 B2  
APPLICATION NO. : 11/560873  
DATED : September 8, 2009  
INVENTOR(S) : Astley et al.

It is certified that error appears in the above-identified patent and that said Letters Patent is hereby corrected as shown below:

Title Page, (75), under "Inventors", delete "Joe" and insert -- Joseph --, therefor.

In Column 7, Line 54, delete "41 1," and insert -- 411, --, therefor.

In Column 12, Line 15, in Claim 9, delete "though" and insert -- through --, therefor.

Signed and Sealed this

Sixteenth Day of March, 2010

David J. Kappos
*Director of the United States Patent and Trademark Office*